(No Model.)
G. H. GALE.
FLEXIBLE FRAME FOR SPRING TOOTH HARROWS, &c.
No. 309,706. Patented Dec. 23, 1884.
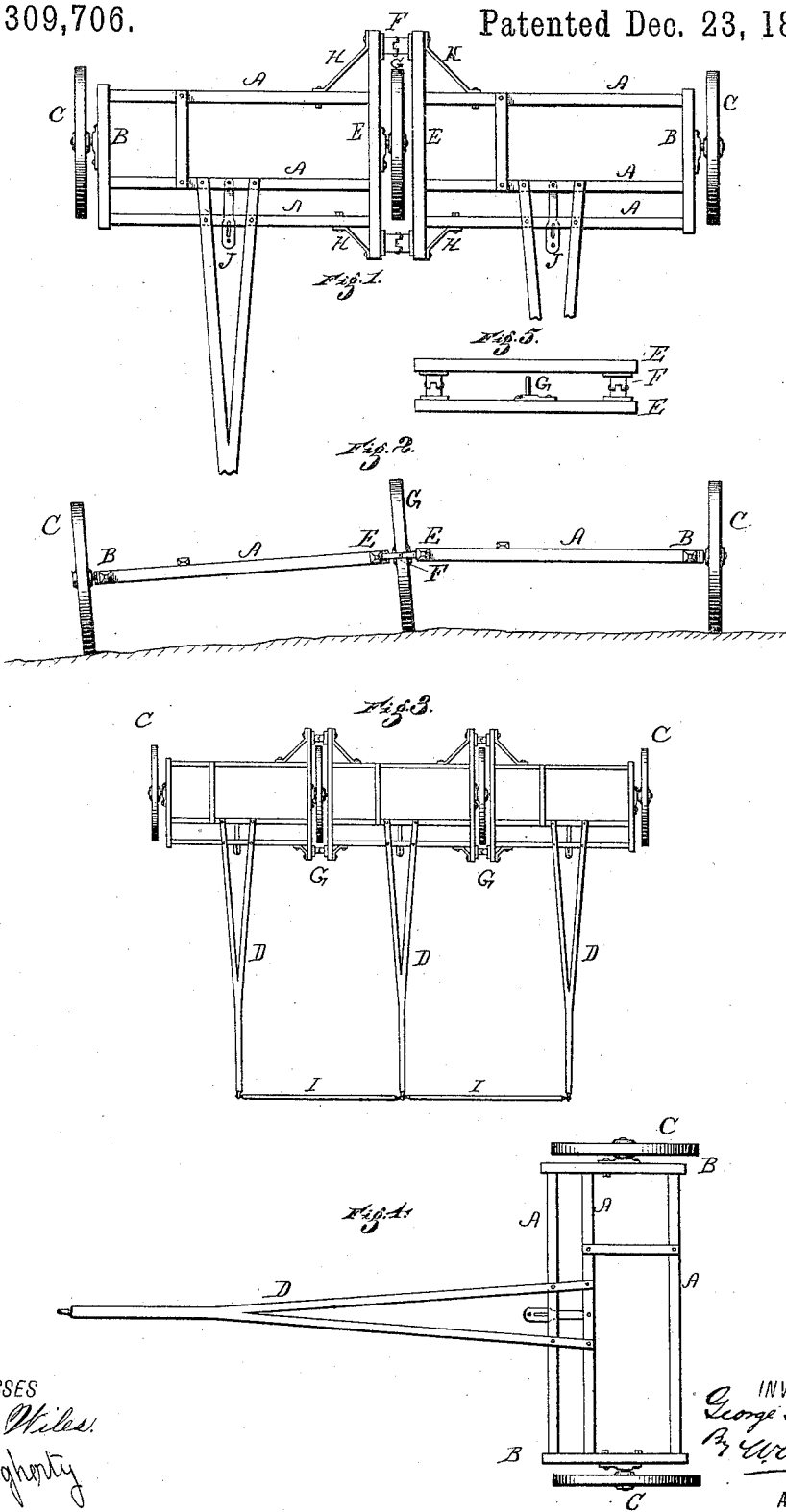
WITNESSES
INVENTOR
George H. Gale.
By W. W. Leggett
Attorney

UNITED STATES PATENT OFFICE.

GEORGE H. GALE, OF DETROIT, MICHIGAN.

FLEXIBLE FRAME FOR SPRING-TOOTH HARROWS, &c.

SPECIFICATION forming part of Letters Patent No. 309,706, dated December 23, 1884.

Application filed March 12, 1884. (No model.)

*To all whom it may concern:*

Be it known that I, GEORGE H. GALE, of Detroit, county of Wayne, State of Michigan, have invented a new and useful Improvement in Flexible Frames for Spring-Tooth Harrows, Seeders, &c.; and I do hereby declare the following to be a full, clear, and exact description of the invention, such as will enable others skilled in the art to which it pertains to make and use it, reference being had to the accompanying drawings, which form a part of this specification.

This invention relates to improvements in flexible frames for spring-tooth harrows and similar machines; and it consists in a device for connecting the adjacent ends of two separate wheeled agricultural implements composed of parallel bars or pieces connected by a flexible joint and provided with a support for a wheel, said device being attachable and detachable to and from the implements.

The invention also consists of other features, all of which will be hereinafter described and claimed, reference being made to the accompanying drawings, in which—

Figure 1 is a plan view of the invention; Fig. 2, a rear end elevation of the same; Fig. 3, a plan view of a modification, showing more than two frames connected according to my invention; Fig. 4, a plan view showing one of the ordinary frame-works of a machine, and Fig. 5, a detached plan view of the flexible attachment.

In the drawings, the letter A indicates the cross-pieces, B the end pieces, C the wheels, and D the pole, of the ordinary frame of an agricultural implement, being essentially the same whether employed for any of the ordinary agricultural wheel implements, although the same may be varied somewhat to conform to the requirements of any particular implement.

The foregoing are shown more particularly in Fig. 4, although similar letters in the other figures indicate similar parts.

E in Figs. 1, 2, and 3 represents the end pieces, F the flexible joints, and G the intermediate wheels, of a flexible attachment whereby two or more of the ordinary machines shown in Fig. 4 may be quickly converted into a single broad machine of two or more sections.

H represents braces which may be employed for stiffening the frame-work in a long machine.

The parallel bars or end pieces E are so constructed that upon removing one of the end pieces B of the ordinary machine they will fit into and occupy the same space, so that the end pieces E, with their flexible joints, constitute in reality a detachable and attachable device, whereby two machines may be quickly converted into a single double machine, requiring but one attendant and possibly dispensing with one or more horses in the performance of the same work which would otherwise devolve upon two single machines.

I represents a link-bar employed to couple together the forward ends of the poles D.

J represents draft devices.

By constructing the parts as a detachable and attachable device, as hereinbefore described, it will be obvious that a farmer has at once the advantages of either a single or a double machine, as he may choose.

I prefer, generally, to make the broad machine in two sections. It is apparent, however, that a greater number of sections may be employed, if desired, as shown in Fig. 3.

I am aware that it is not broadly new to hinge together two wheeled or toothed frames with a supporting ground-wheel journaled between the adjacent hinged ends. My invention differs from such machines, in that I provide separated end pieces between which are interposed flexible joints to connect such end pieces, in contradistinction to directly pivoting the adjacent ends of the transverse front and rear side sills to journals on the front and rear ends of a frame interposed between the adjacent ends of two toothed frames.

I am also aware that in duplex or double machines coupled together each machine has been provided with an independent tongue or pole; but such I do not broadly claim.

I am also aware that a stalk-cutter has had its axle centrally jointed and supported by a central and two end ground-wheels, the axle having forward projecting bars connected by two transverse bars jointed directly at their adjoining ends in line with the joint of the axle. Such construction, however, is not my invention, and is not capable of convenient application to machines already in use.

What I claim is—

1. A device for connecting the adjacent ends of two separate wheeled agricultural implements, consisting of parallel bars or pieces connected together by a flexible joint and provided with a support for a wheel, said device being attachable and detachable to and from the implements, substantially as described.

2. The frames of two separate agricultural implements, in combination with two parallel bars or pieces connected together by a flexible joint and provided with a support for a wheel, said flexibly-connected parallel pieces being interposed between said frames and connecting the same together, and adapted to be attached and detached to and from the same, substantially as described.

3. The frames of two separate agricultural implements, in combination with parallel bars or pieces connected together by a flexible joint and interposed between the adjacent ends of said frames, and attachable and detachable to and from the ends of said frames, substantially as described.

In testimony whereof I sign this specification in the presence of two witnesses.

GEORGE H. GALE.

Witnesses:
  N. S. WRIGHT,
  M. B. O'DOGHERTY.